United States Patent
Blanchet et al.

(10) Patent No.: US 6,492,045 B1
(45) Date of Patent: Dec. 10, 2002

(54) CORRUGATED CURRENT COLLECTOR FOR DIRECT INTERNAL REFORMING FUEL CELLS

(75) Inventors: Scott Blanchet, Monroe, CT (US); Joel Doyon, Bantam, CT (US); Lawrence Novacco, Brookfield, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 09/891,690

(22) Filed: Jun. 26, 2001

(51) Int. Cl.⁷ .................................. H01M 8/18
(52) U.S. Cl. .................... 429/20; 429/44; 429/233; 429/241; 429/243; 429/244
(58) Field of Search ................... 429/20, 44, 233, 429/241, 243, 244

(56) References Cited

U.S. PATENT DOCUMENTS

| | | | |
|---|---|---|---|
| 3,516,867 A | * 6/1970 | Dankese ................. | 429/26 |
| 4,548,876 A | 10/1985 | Bregoli .................. | 429/39 |
| 4,983,472 A | 1/1991 | Katz et al. .............. | 429/38 |
| 5,795,665 A | 8/1998 | Allen .................... | 429/12 |

\* cited by examiner

*Primary Examiner*—Laura Weiner
(74) *Attorney, Agent, or Firm*—Robin, Blecker & Daley

(57) ABSTRACT

A fuel cell corrugated current collector having successive spaced rows of corrugations, with the corrugations in a given row establishing successive peak and valley regions along the given row and the spaced rows of corrugations being adapted so that corresponding peak regions from row-to-row establish through passages for receiving and supporting solid catalyst elements. The spaced rows of corrugations are such that there is a given pitch between successive peak regions. The corrugations in the rows are also such that corresponding peak regions from row-to-row have a finite off-set which is less than 50 percent of the pitch. This establishes a plurality of through passages in the current collector each extending from row-to-row for receiving and supporting the solid catalyst elements. Also, the off-set is based on the catalyst dimensions and is set such that the corrugations engage the catalyst elements.

9 Claims, 13 Drawing Sheets

CORRUGATED CURRENT COLLECTOR FOR DIRECT INTERNAL REFORMING FUEL CELLS

BACKGROUND OF THE INVENTION

This invention relates to current collector electrode supports for fuel cells. More specifically, this invention relates to corrugated current collectors for high temperature, internally reforming, planar fuel cells.

A fuel cell is a device which directly converts chemical energy stored in a fuel such as hydrogen or methane into electrical energy by means of an electrochemical reaction. This differs from traditional electric power generating methods which must first combust the fuel to produce heat and then convert the heat into mechanical energy and finally into electricity. The more direct conversion process employed by a fuel cell has significant advantages over traditional means in both increased efficiency and reduced pollutant emissions.

In general, a fuel cell, similar to a battery, comprises a negative (anode) electrode and a positive (cathode) electrode separated by an electrolyte which serves to conduct electrically charged ions between them. In contrast to a battery, however, a fuel cell will continue to produce electric power as long as fuel and oxidant are supplied to the anode and cathode, respectively. To achieve this, gas flow fields are provided adjacent to the anode and cathode through which fuel and oxidant are supplied. In order to produce a useful power level, a number of individual fuel cells must be stacked in series with an electrically conductive separator plate between each cell.

In internally reforming fuel cells, a steam reforming catalyst is placed within the stack of fuel cells to allow direct use of hydrocarbon fuels (e.g., methane, coal gas, etc.) in the fuel cells without the need for expensive and complex external reforming equipment. Two forms of internal reforming have been used. Indirect internal reforming is accomplished by placing reforming catalyst in an isolated chamber within the stack and routing the reformed gas from this chamber into the anode compartment of each fuel cell. Direct internal reforming is accomplished by placing reforming catalyst within the active anode compartment of each fuel cell. This catalyst is then available to reform fuel gas with steam formed by the electrochemical reactions of the fuel cell and can result in very high reforming efficiency and fuel utilization.

The particular geometry used for the anode chamber and catalyst support is important for many reasons. The geometry should be selected to minimize pressure drop for fuel flow as higher pressure requires more auxiliary power and results in lower system efficiency. In addition, for stacks with many cells, low variation in flow restriction from cell to cell is critical to insure that each cell receives the same fuel flow and thereby operates at the same fuel utilization. As the efficiency of the fuel cell stack is limited by the individual cell which receives the least amount of fuel, uniform fuel flow is very important to achieve maximum fuel utilization and stack electrical efficiency.

A major feature of a fuel cell which also relates to direct internal reforming catalyst is the useful life of the cell. As the cell ages, the activity of the reforming catalyst in the anode chamber decays due to the poisoning effects of the electrolyte vapor within the passage. This decay in activity reduces the effectiveness of the catalyst and the reforming efficiency of the cell. This, in turn, reduces the electrical efficiency of the cell because less reformed fuel is available for the electrochemical reactions. As the effectiveness of the catalyst is directly related to the mass of catalyst available for reforming, one way to increase the reforming efficiency and cell life is to increase the catalyst mass in the anode chamber.

Another important characteristic of the components used to form the fuel and oxidant flow fields of a fuel cell is the ability of the components to apply uniform pressure to the active cell components (i.e., anode,.cathode and matrix). Uniform pressure is important to insure uniform contact resistance over the cell active area as well as to reduce the likelihood of gaps forming between cell components during operation.

The direct internal reforming catalyst must also be protected from deactivation by electrolyte wicking from the abutting anode containing liquid electrolyte. One method to protect the catalyst is to design the corrugated current collector so that it shields the catalyst, acting as a barrier to electrolyte migration from the adjacent anode component.

Many different component geometries have been proposed and used by fuel cell manufacturers for providing the fuel and oxidant flow fields and catalyst support for direct internally reforming fuel cells. U.S. Pat. No. 4,548,876 describes a corrugated current collector used for this purpose. In the current collector of the '876 patent, particulate material is placed in the current collector corrugations and is used for diffusion and support. The particulate material faces a catalyst layer which, in turn, abuts an active electrode. The particulate material is preferably made of nonconducting alumina, but may also comprise the same material as used in the catalyst layer. This geometry is limited in that a considerable portion of the active electrode is blocked by the particulate material and the gas is forced to flow around the blockage away from the electrode.

U.S. Pat. No. 4,983,472 describes a corrugated current collector with a plurality of corrugations forming dimples arranged in a checkerboard pattern for use on the cathode side of the cell. This configuration represents an improvement over the current collector of the '876 patent by allowing the gas much better access to the active electrode. However, the configuration has limitations when used in an anode chamber which also houses a direct internal reforming catalyst in the form of elongated solid elements. Due to the checkerboard pattern, these catalyst elements can only be loaded substantially perpendicular to the fuel gas flow. This results in high flow restriction and susceptibility to large variation in flow restriction from cell to cell.

Another disadvantage of the checkerboard pattern of dimples used in the current collector of the '472 patent is that when applied to both the anode and cathode chambers, a larger scale checkerboard pattern of compressive load results on the cell active area due to the periodic nesting of the corrugation feet through the bipolar plate. This non-uniform pressuredistribution could result in variation in the cell contact resistance.

A further concern when using the current collector of the '472 patent relates to the flow field formed by placing the solid catalyst elements perpendicular to the flow direction. The resulting geometry is characterized by nearly equal resistance to flow parallel and perpendicular to the primary flow direction. This means that as gas is generated in high current producing areas of the cell it is allowed to expand laterally, apparently enhancing mixing within the cell. However, this also tends to supply high current producing areas of the cell with even more fresh fuel resulting in high current density and temperature gradients within the cell.

U.S. Pat. No. 5,795,665 describes an alternate corrugated current collector design wherein the current collector is combined with a separator plate to form gas passages and support for solid catalyst elements. In this design, all the cell components are formed in a corrugated pattern and nested together. As a result forming the cell components is a complex operation. Also, the space available for the reforming catalyst elements is limited.

It is therefore an object of the present invention to provide a novel corrugated current collector design which overcomes the disadvantages of the prior art designs.

It is also an object of the present invention to provide a corrugated current collector which allows solid direct internal reforming catalyst elements to be loaded substantially parallel to the primary direction of gas flow.

It is a further object of the present invention to provide a corrugated current collector which allows the space provided for solid reforming catalyst elements to be maximized.

It is yet a further object of the present invention to provide a corrugated current collector which results in more uniform pressure distribution to the cell active components.

It is still a further object of the present invention to provide a corrugated current collector which results in a pattern flow field geometry characterized by high transverse flow resistance and low axial flow resistance thus resulting in more uniform current and temperature distributions within the cell.

It is also an object of the present invention to provide a corrugated current collector which results in better shielding of the direct internal reforming solid catalyst elements from the cell electrolyte and holding these catalyst elements away from the electrolyte containing electrode.

SUMMARY OF THE INVENTION

In accordance with the principles of the present invention, the above and other objectives are realized in a current collector having successive spaced rows of corrugations, with the corrugations in a given row establishing successive peak and valley regions along the given row and the spaced rows of corrugations being adapted so that corresponding peak regions from row-to-row establish through passages for receiving and supporting solid catalyst elements.

In the embodiment of the invention to be described hereinafter, the spaced rows of corrugations are such that there is a given pitch between successive peak regions in a row and a given offset in the peak regions from row-to-row. In particular, the offset is selected to be finite and to be less than 50 percent of the pitch, so as to establish the plurality of through passages for the solid catalyst elements. Also, the offset is further selected based on the catalyst dimensions and is such that the corrugations engage the catalyst elements.

BRIEF DESCRIPTION OF THE DRAWINGS

The above and other features and aspect of the present invention will become more apparent upon reading the following detailed description in conjunction with the accompanying drawings, in which.

DETAILED DESCRIPTION OF THE INVENTION

Figure 1:
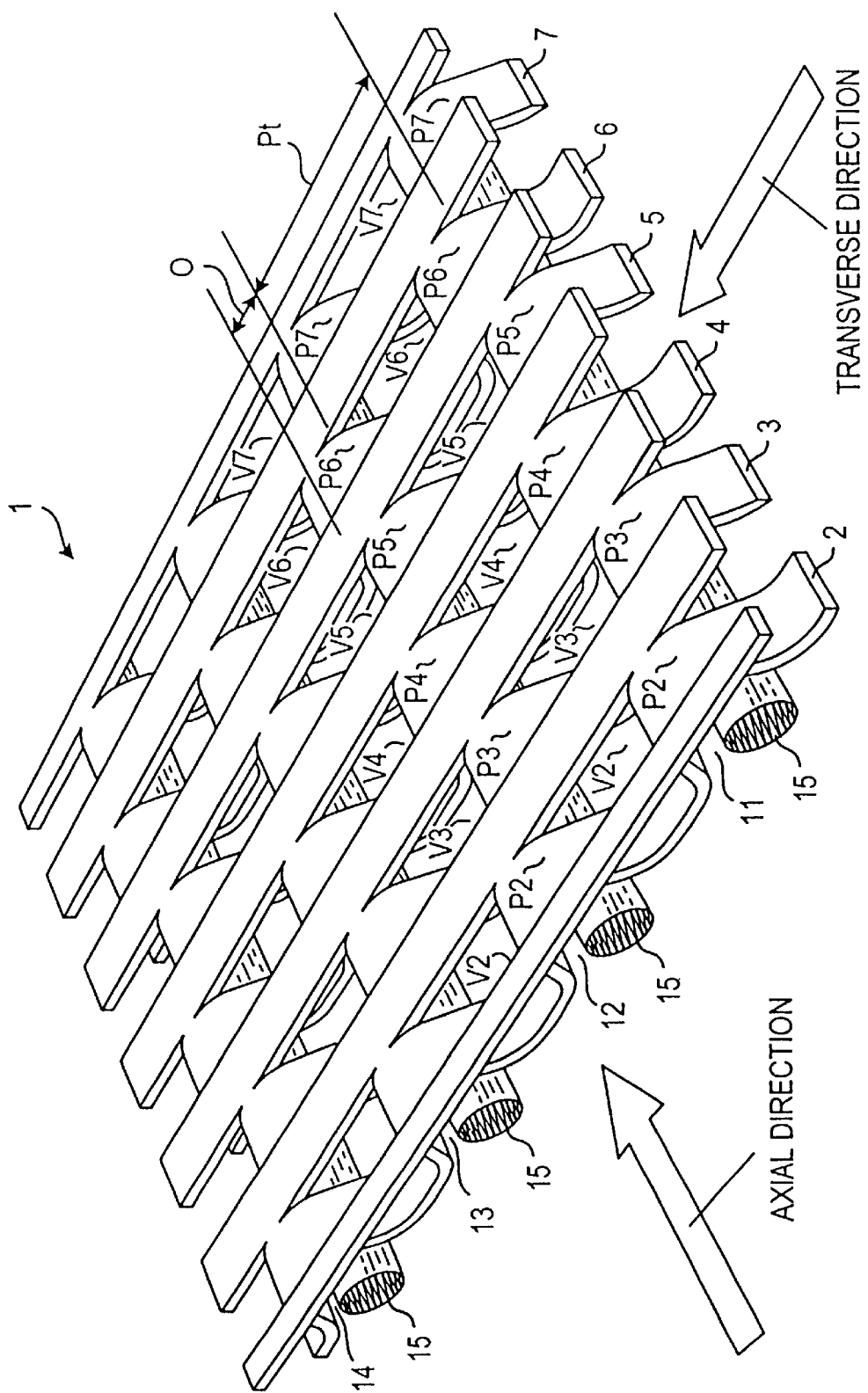
FIG. 1 shows in perspective view a corrugated current collector in accordance with the principles of the present invention.

FIG. 1 shows a corrugated current collector 1 in accordance with the principles of 20 the present invention. As shown, the current collector 1 includes a plurality of spaced rows of corrugations 2–7. Each row of corrugations establishes successive peak and valley regions P and V along the length of the corrugation. These are labeled P2, V2 through P7, V7 for the corrugation rows 2–7.

The successive peaks in a given row of corrugations define a given pitch for the given row. In the case shown, the pitch for each of the rows is the same Pt. Moreover, each row of corrugations 2–7 is offset by a finite amount from the preceding and succeeding rows of corrugations, with the offset alternating in opposite directions from row-to-row. Thus, the row of corrugations 3 is offset to the right from the row of corrugations 2 and the row of corrugations 4 is offset to the left from the row of corrugations 3. Again, in the case shown the offset O is the same from row-to-row.

In accordance with the principles of the present invention, the offset O for the rows is selected to be less than 50 percent of the pitch Pt. With this selection for the offset, the rows of corrugations 2–7 define a plurality of through passages each of which extends from row-to-row and each of which is adapted to receive and support a solid catalyst element.

Figure 3:
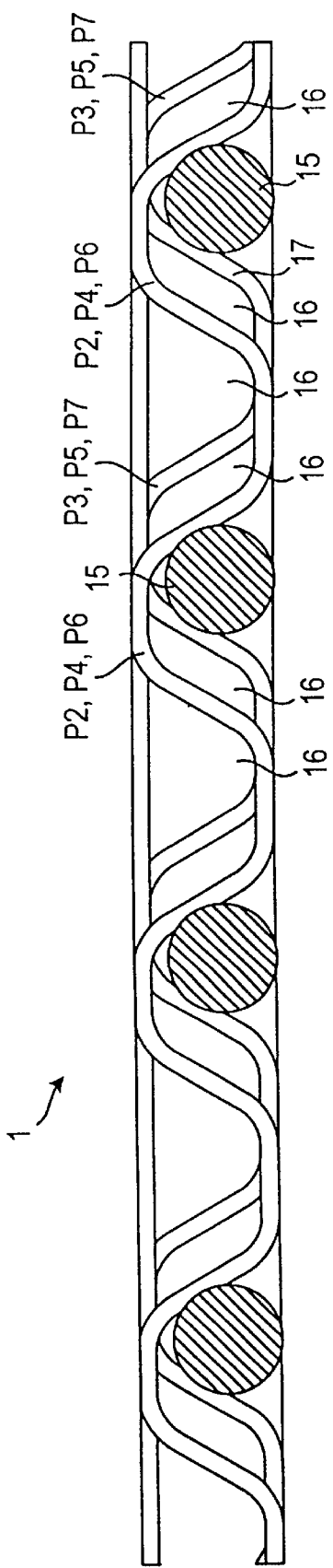
FIG. 3 shows an end view of the corrugated current collector of FIG. 1.

More particularly, the rows of corrugations 2–7 define the through passages 11–14, as shown in FIG. 3, each of which receives and supports a solid catalyst element 15. As seen in FIG. 3, a catalyst element 15 is engaged by a segment of each of the corrugations establishing its respective through passage. The succession of segments engaging an element 15 extend over the length of the element, thereby providing the desired support of the element via the current collector 1.

Establishing the through passages 11–14 so that they extend transverse to the length of the rows of corrugations 2–7 permits the catalyst elements 15 received in the passages to also be situated transverse to the length of the corrugations. This positioning of the catalyst elements 15 has considerable advantages when the corrugated current collector 1 is used as the current collector on the anode side of a direct internal reforming fuel cell in which the catalyst elements 15 serve as the internal reforming catalyst.

Specifically, when used as such an anode side current collector, the catalyst elements 15 become situated parallel to the axial flow direction of the fuel gas, so that there remains enlarged free flow areas for the passage of the gas. These free flow areas 16 can be seen in FIG. 3. As the flow restriction for the fuel gas of a fuel cell is a function of the minimum free flow areas available to the gas, the free flow areas 16 of the current collector 1 result in a significantly lower flow restriction of the fuel gas, as compared with that of prior art corrugated current collector configurations.

Figure 2:
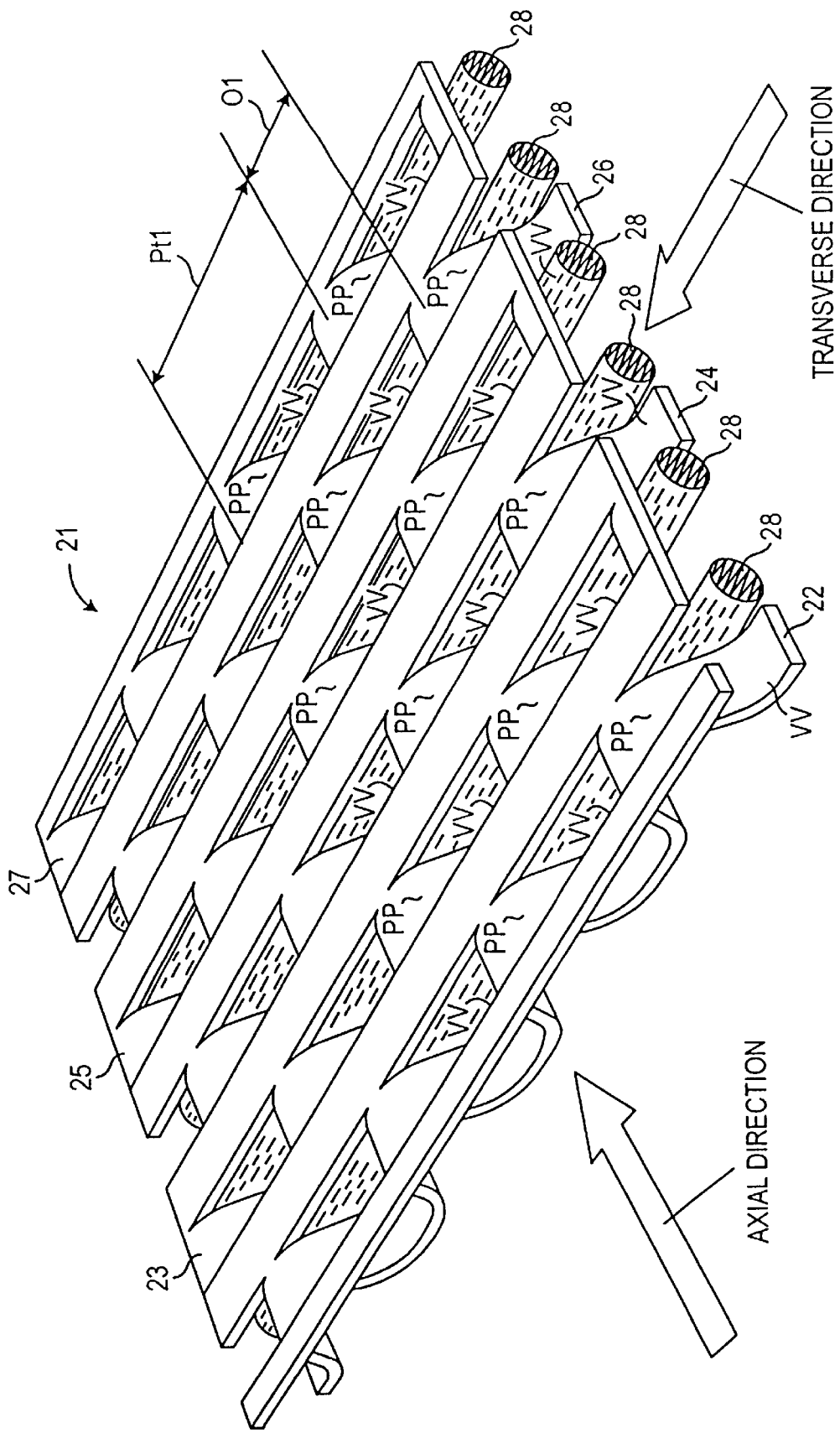
FIG. 2 shows in perspective view a prior art corrugated current collector of the type disclosed in the '472 patent.

This can be seen by comparing the free flow areas 16 of the current collector 1 with the free flow areas of a prior art corrugated current collector of the type disclosed in the '472 patent. Such a prior art corrugated current collector 21 is shown in FIG. 2 as having rows of corrugations 22–27 formed to provide a checkerboard pattern of peak and valley regions, PP and VV. This checkerboard pattern is a result of selecting the offset O1 of the corrugations from row-to-row to be equal to 50 percent of the pitch Pt1.

Figure 4:
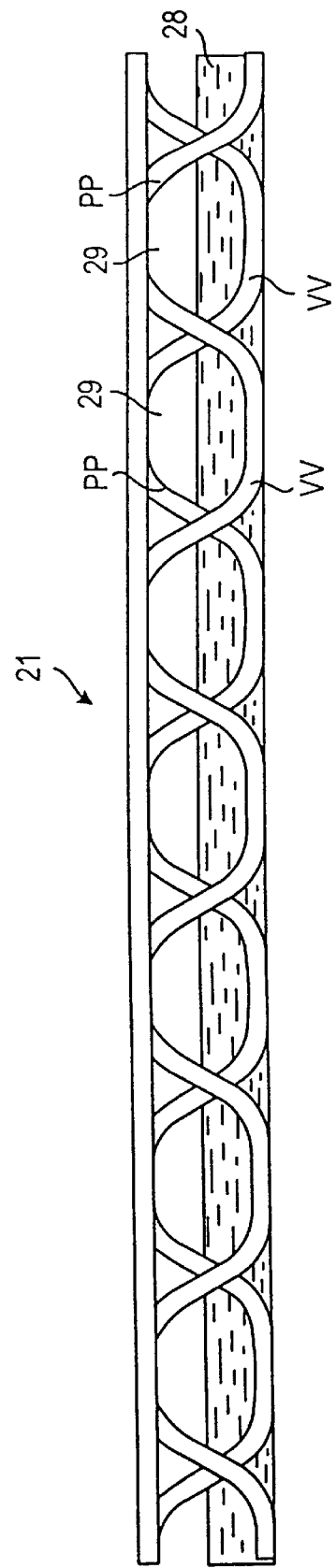
FIG. 4 shows an end view of the prior art corrugated current collector of FIG. 2.

As can be seen from FIG. 2, with the prior art current collector 21, as an anode side current collector, the solid catalyst elements 28 must be situated along the length of the corrugations and, therefore, transverse to the gas flow direction. This results in free flow areas 29 of limited extent, as can be seen in the end view of the prior art current collector 21 shown in FIG. 4.

Figure 5:
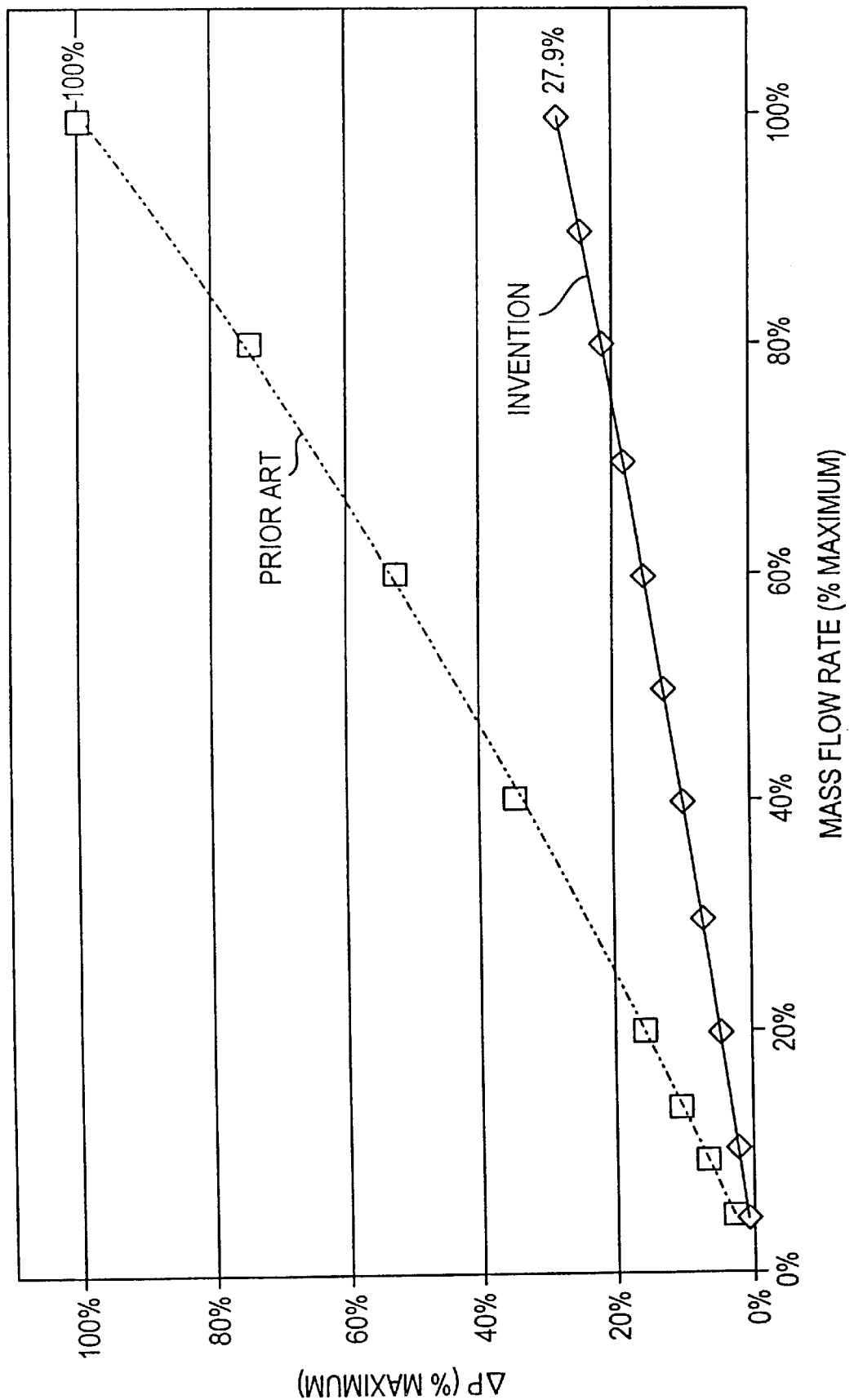
FIG. 5 shows the measured pressure drop as a function of gas flow for the corrugated current collector of FIG. 1 and for the prior art corrugated current collector of FIG. 2.

Due to the free flow areas 29 of limited extent, the gas flow restriction in a fuel cell using the prior art current collector 21 is almost four times that of current collector 1 of the invention. This is shown in FIG. 5 which depicts the measured pressure drop of the current collector 1 in comparison to the measured pressure drop of the prior art current collector 21.

The current collector of the invention is preferably formed from a single sheet of suitable, material compatible with the particular fuel cell (e.g., stainless steel, Inconel, nickel-clad stainless steel, etc.). The material is punched using a die and press to form the valley regions or feet and the peak regions. The depth of the punching operation determines the height of the resulting gas flow field. The orientation of the valley regions is selected so that in the axial direction of gas flow the least amount of cross sectional area will be obstructed by the valley regions in order to minimize gas flow restriction.

The specific dimensions of the valley regions and the stamped pattern are selected to yield adequate strength under compressive load and to provide adequate access area for the gas to the active electrode. Another consideration in specifying the size of the valley region is to insure that the hole or empty area which the active electrode must span not be so large that the electrode sags into the flow field.

The pitch Pt and the offset O are, in turn, selected as above-described to obtain the advantages previously discussed. Further, by basing the offset O on the diameter of catalyst element 15, the catalyst diameter, and, therefore, mass, can be maximized thereby maximizing the useful life of the cell. The peak regions, as above-described, can also be made to engagingly lock the regions 17 the catalyst elements 15 against the bipolar separator and away from the electrolyte containing electrode.

Because the minimum free flow areas 29 of the prior art current collector 21 are significantly affected by the diameter of the catalyst and this diameter can be difficult to control in a manufacturing plant, the variation in flow restriction for the prior art current collector 21 in manufactured fuel cells can be significant. For the current collector of 1 of the invention, however, the minimum free flow areas 16 are much less affected by the catalyst diameter and the resulting variation in flow restriction from cell to cell is greatly reduced.

Figure 6:
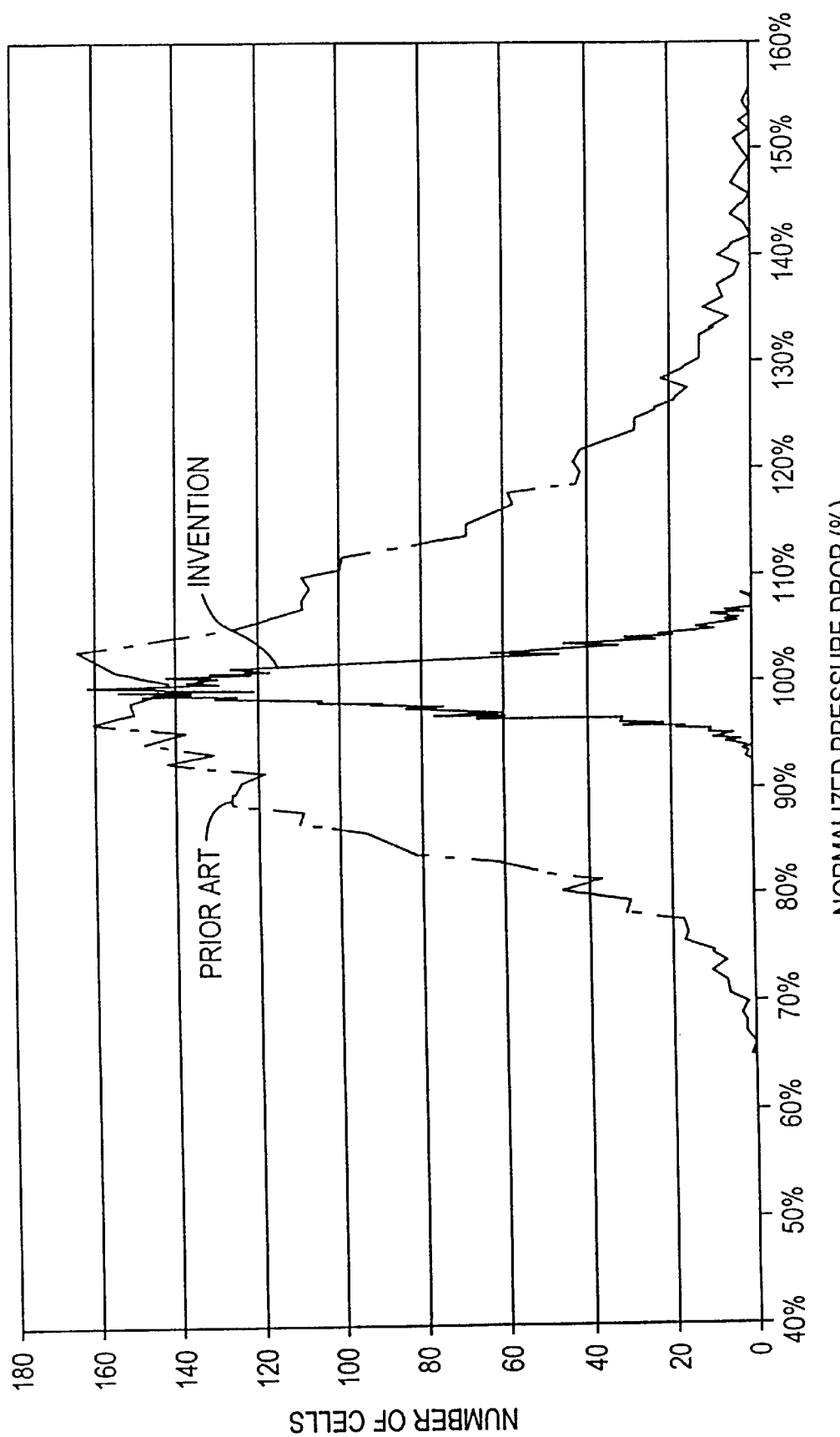
FIG. 6 shows a plot of the predicted distribution of flow resistance for 5000 cells using the corrugated current collector of FIG. 1 and the prior art corrugated current collector of FIG. 2.

FIG. 6 shows the results of a Monte Carlo simulation which predicts the flow restriction of a large number of cells using a mathematical model for pressure drop and normally distributed, randomly selected values for the inputs. The results indicate that for cells using the current collector 1 of the invention the distribution of flow restriction from cell to cell is five to six times tighter than that for cells using the prior art current collector 21.

Figure 7:
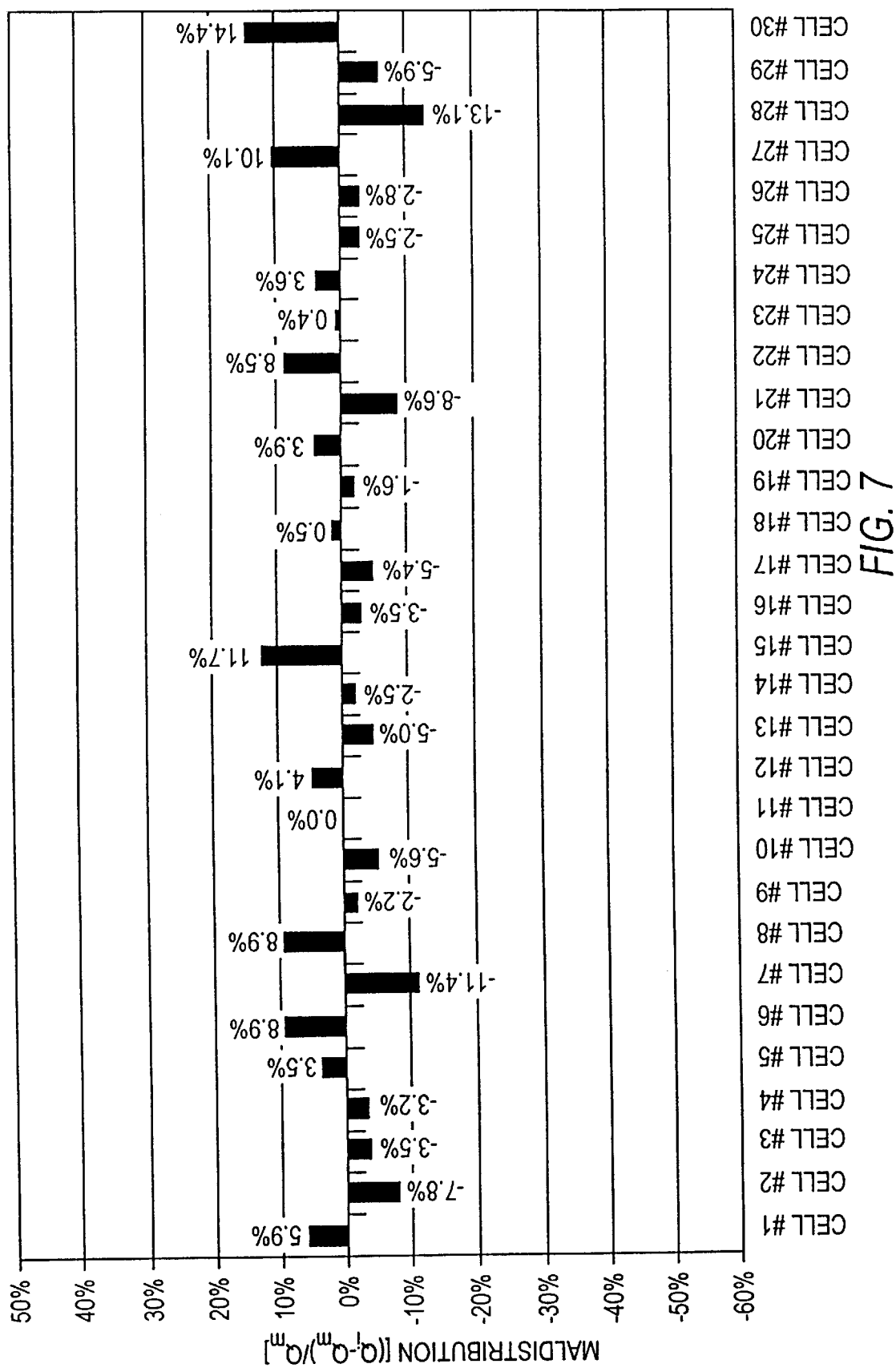
FIG. 7 shows the measured flow non-uniformity for a thirty cell stack made with the corrugated current collector of FIG. 1 illustrating less than +/−15% variation.
Figure 8:
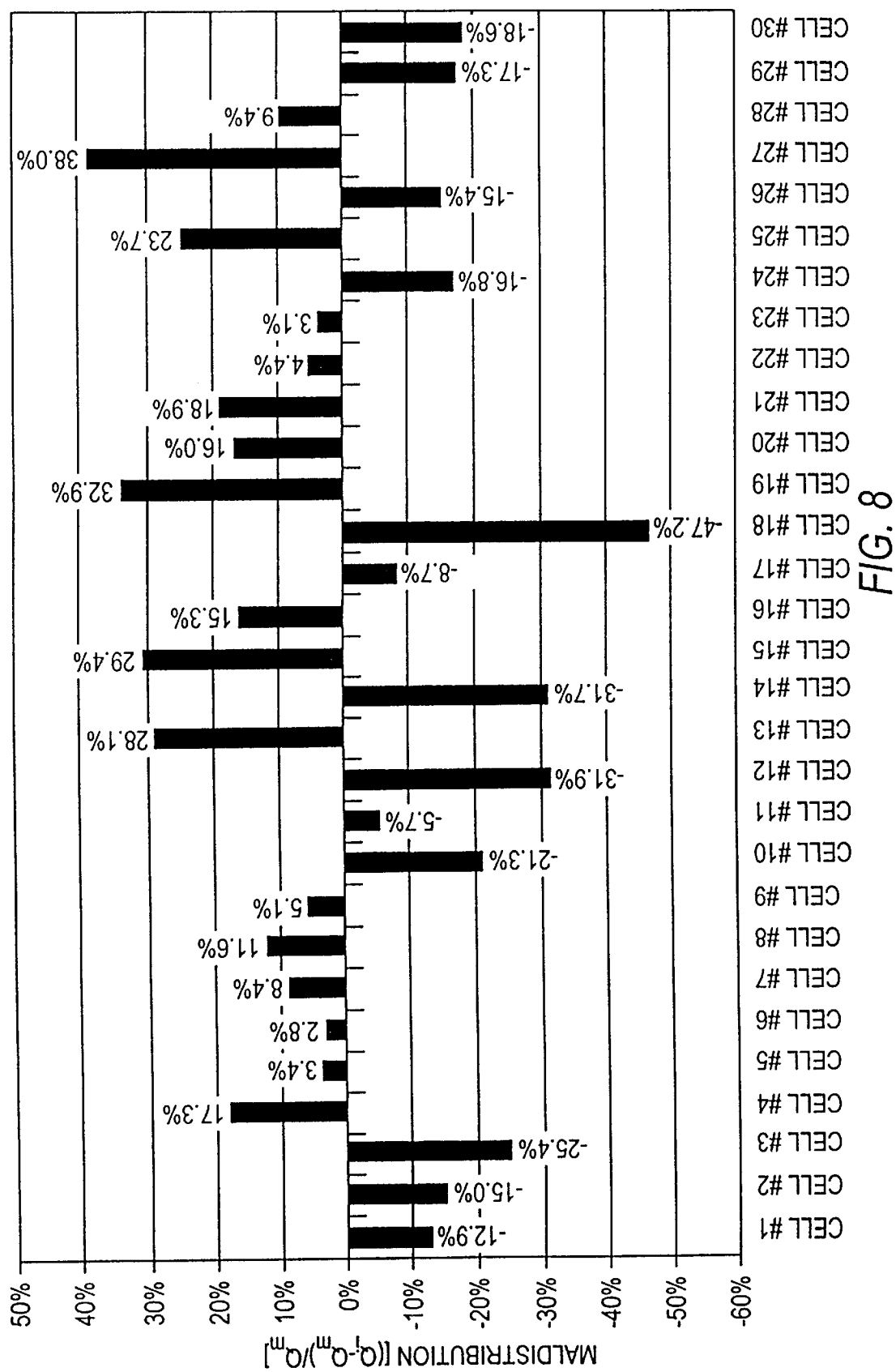
FIG. 8 shows the measured flow non-uniformity for a thirty cell stack made with the prior art corrugated current collector of FIG. 2 illustrating greater than +/−30% variation.

FIGS. 7 and 8 show measured distributions of flow for two thirty cell stacks, one made using the current collector 1 of the invention and the other made by using the current collector 21 of the prior art. These results demonstrate, experimentally, a two to three-fold reduction in flow non-uniformity achieved by using the current collector of the invention.

As mentioned above, the row to row offset O of the corrugations of the current collector 1 can be varied from a finite value (i.e. a value greater than zero percent of the pitch Pt) to a value of less than 50 percent of the pitch Pt. This allows for catalyst of different diameters. Moreover, while an offset O of 0% of the pitch would allow a catalyst. of maximum diameter to be used, this is undesirable for two reasons. First, the catalyst would be situated very close to the anode electrode of the fuel cell and could potentially wick liquid electrolyte directly from the anode. Second, with 0% offset the interference of the corrugations with the catalyst elements 15 which helps hold the catalyst in place would then be lost.

Figure 9:
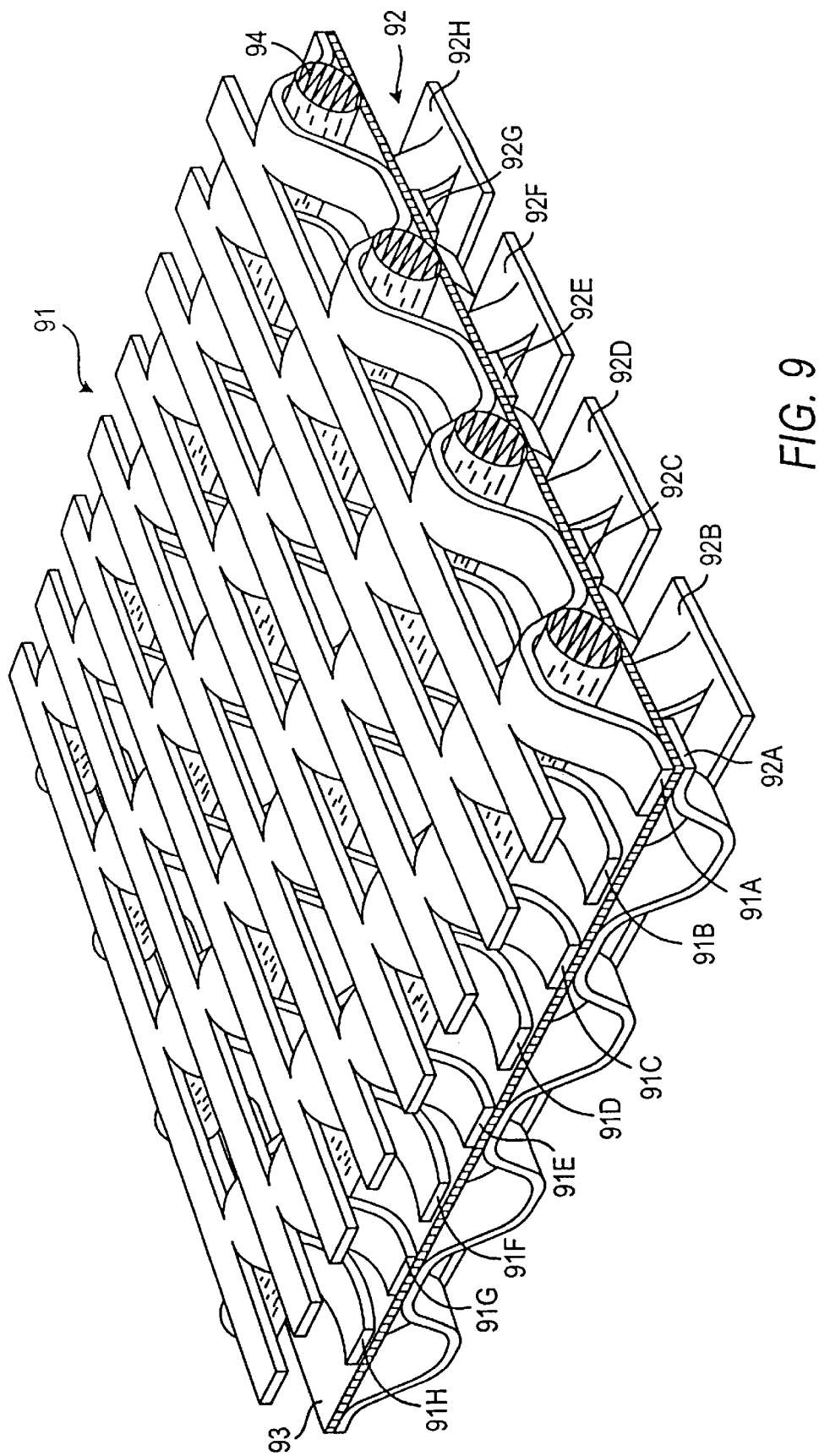
FIG. 9 shows a perspective view of an anode current collector with catalyst elements having the form of the corrugated current collector of FIG. 1 and a cathode current collector also having the form of the corrugated current collector of FIG. 1 situated adjacent opposing sides of a bipolar separator plate to illustrate the contact regions of the peak regions of the current collectors on the separator plate.

Another important advantage of the corrugated current collector of the invention is the desirable contact distribution realized with the collector. FIG. 9 shows current collectors 91 and 92, configured similarly to the current collector 1 of FIG. 1, used on the anode and cathode sides, respectively, of a bipolar plate 93 of a fuel cell. As can be seen, the anode side current collector 91 supports catalyst elements 94 for internal reforming.

As can be seen in FIG. 9, due to the configuration of the current collectors 91 and 92, the valleys regions in the rows of corrugations 91A, 91C, 91E and 91G of the anode side collector 91contact the bipolar plate 93 at positions aligned with the positions at which the valley regions of the rows of corrugations 92A, 92C, 92E and 92G of the cathode side current collector 92 contact the plate 93. On the other hand, the valley regions in the rows of corrugations 91B, 91D, 91F and 91H of the anode side current collector 91 contact the bipolar plate 93 at positions which are misaligned from the positions at which the valley regions of the rows of corrugations 92B, 92D, 92F and 92H of the cathode side current collector 92 contact the bipolar plate 93.

In the latter areas where the valley regions of the corrugations of the anode and cathode current collectors do not align, the separator plate 93 is allowed to flex making the structure soft. In areas of the current collectors where the valley regions do align the separator 93 is in compression making the structure firm.

Figure 10:
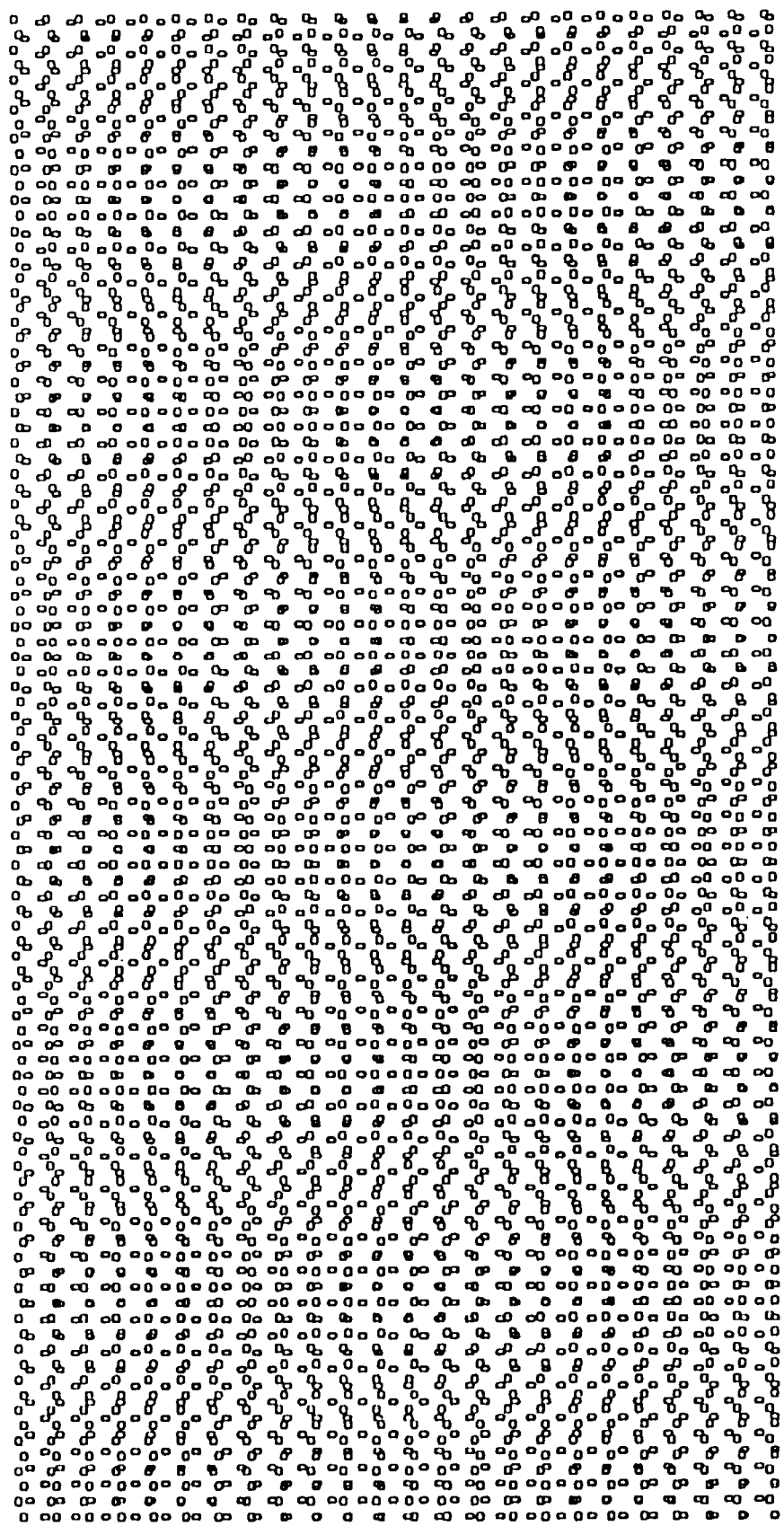
FIG. 10 shows a plan view of the contact pattern achieved with the corrugated current collector of FIG. 1 demonstrating the general uniformity of the resulting distribution.
Figure 11:
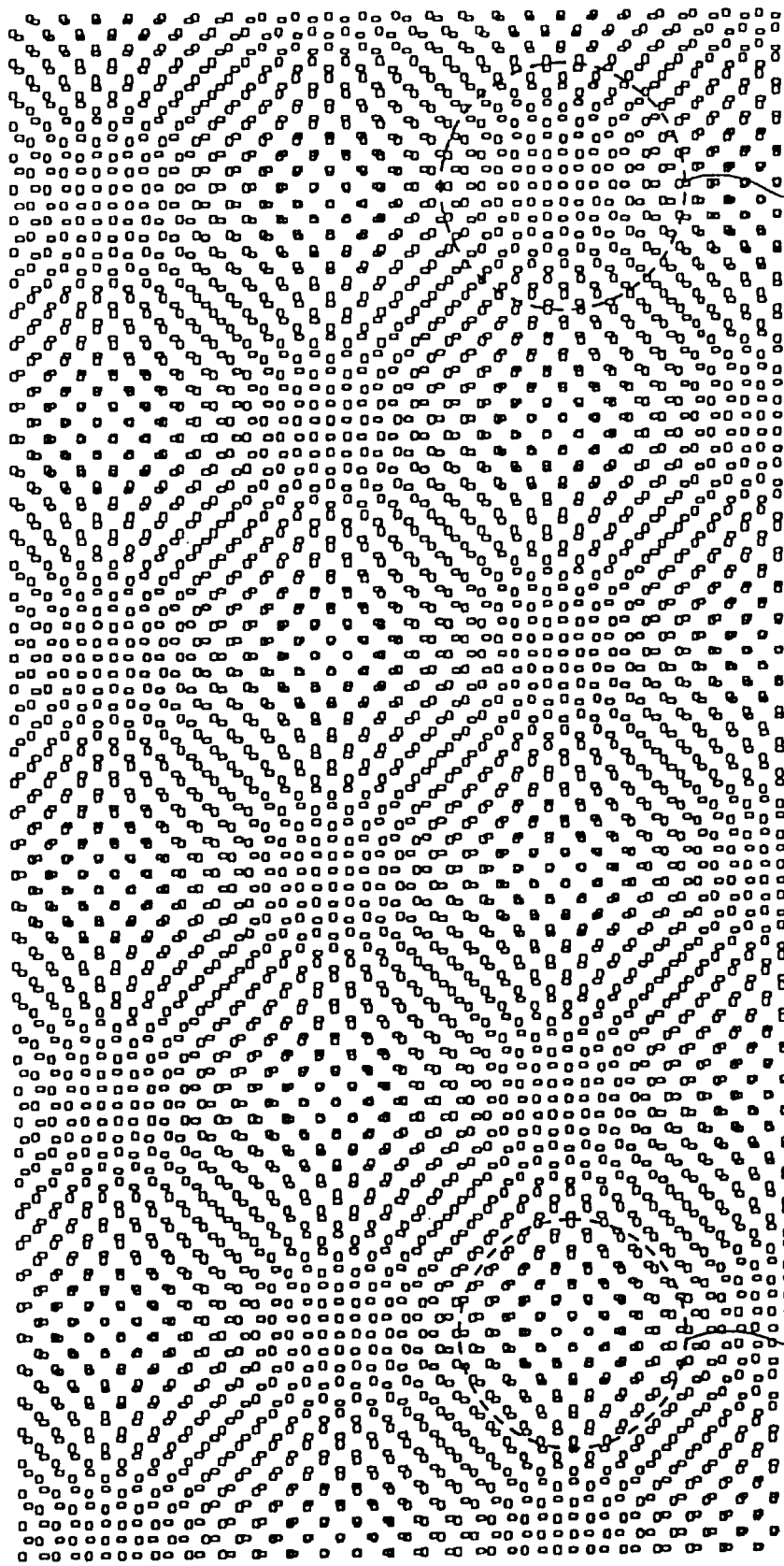
FIG. 11 shows a plan view of the contact pattern achieved with the prior art corrugated current collector of FIG. 2 demonstrating the resulting checkerboard pattern of high and low pressure.

FIGS. 10 and 11, respectively, show schematically the resulting pattern of soft and firm areas for the current collectors of the invention compared with the same areas using the prior art current collector of FIG. 2 for the anode and cathode side current collectors. As can be seen from FIG. 10, the pattern formed by using the current collectors in accordance with the invention, is generally uniform with only very localized points of alignment and misalignment. FIG. 11, on the other hand, shows that the pattern resulting from using the prior art current is a more large scale, checkerboard pattern of alignment which results in large areas of high (30) and low (31) pressure applied to the active cell components.

Another advantage of the current collector 1 of the invention also derives from placing the reforming catalyst substantially parallel to the gas flow direction. With the catalyst loaded parallel to the gas flow, the transverse flow restriction is much higher than the axial flow restriction (see, FIGS. 1, 3 and 4). However, with the catalyst loaded perpendicular to the flow, the transverse flow restriction is nearly the same as the axial flow restriction (see, FIGS. 2, 9 and 10). This difference in transverse flow restriction results in the temperature gradient of fuel cells using the current collector of the invention being less than that of fuel cells using the prior art current collector More particularly, since the electrical current is necessarily non-uniform for large area fuel cells, the generation of gas in the anode chamber is also non-uniform. For fuel cells using the current collector of the invention, the localized gas generated cannot easily expand laterally and, therefore, fresh fuel is caused to be delivered to other, lower current areas of the cell. In fuel cells using the current collector of the prior art, the gas generated is allowed to expand laterally which causes high current areas to be fed even more fresh fuel, thereby increasing current maldistribution.

Figure 12:
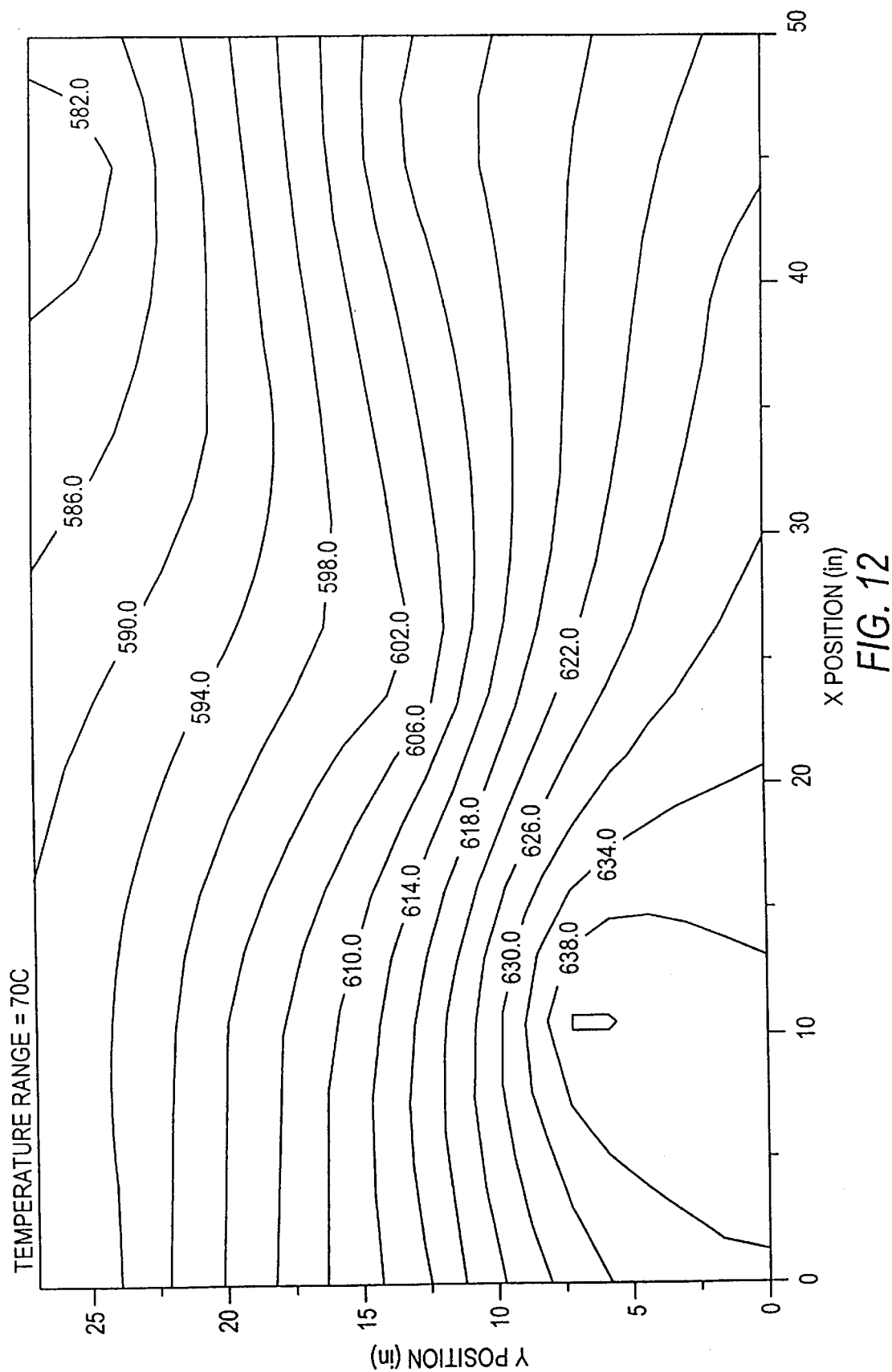
FIG. 12 shows the measured temperature distribution in a plan view of a thirty fuel cell stack made with the corrugated current collector of FIG. 1 illustrating a temperature range of 70° C.
Figure 13:
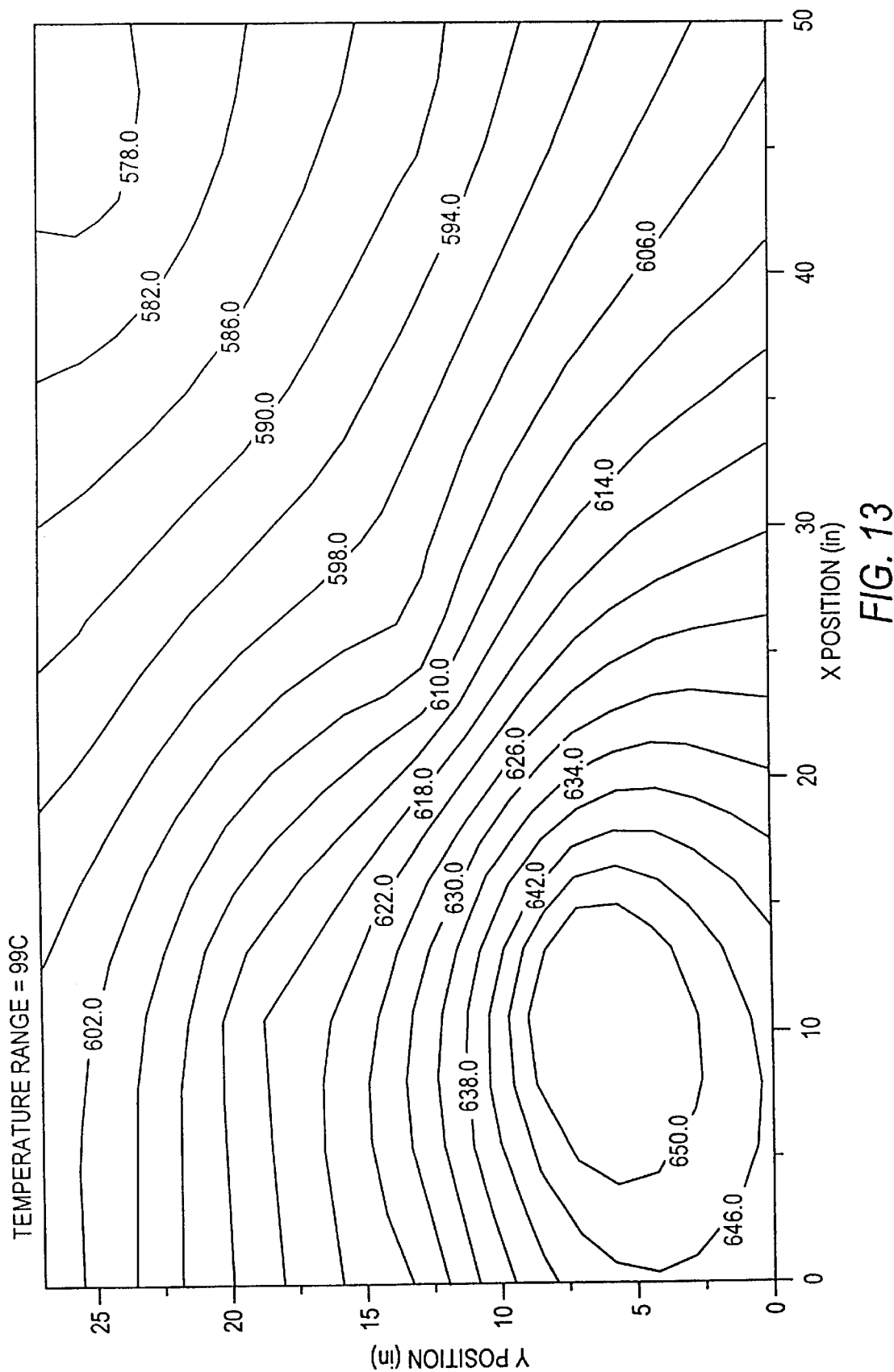
FIG. 13 shows the measured temperature distribution in a plan view of a thirty fuel cell stack made with the prior art corrugated collector of FIG. 2 illustrating a temperature range of 99° C.

The result is that fuel cells using the current collector of the invention display less temperature gradient than fuel cells using the current collector of the prior art. This can be seen from the experimental data set forth in FIGS. 12 and 13. These figures show temperature gradient data performed in thirty cell stacks using the current collector 1 of the invention and the current collector 21 of the prior art, respectively. As can be seen, the temperature gradient for the stack using the current collector of the invention had a maximum of 70° C. temperature gradient, while the stack using the prior art current collector had a maximum of 99° C. temperature gradient for the same operating conditions.

Figure 14:
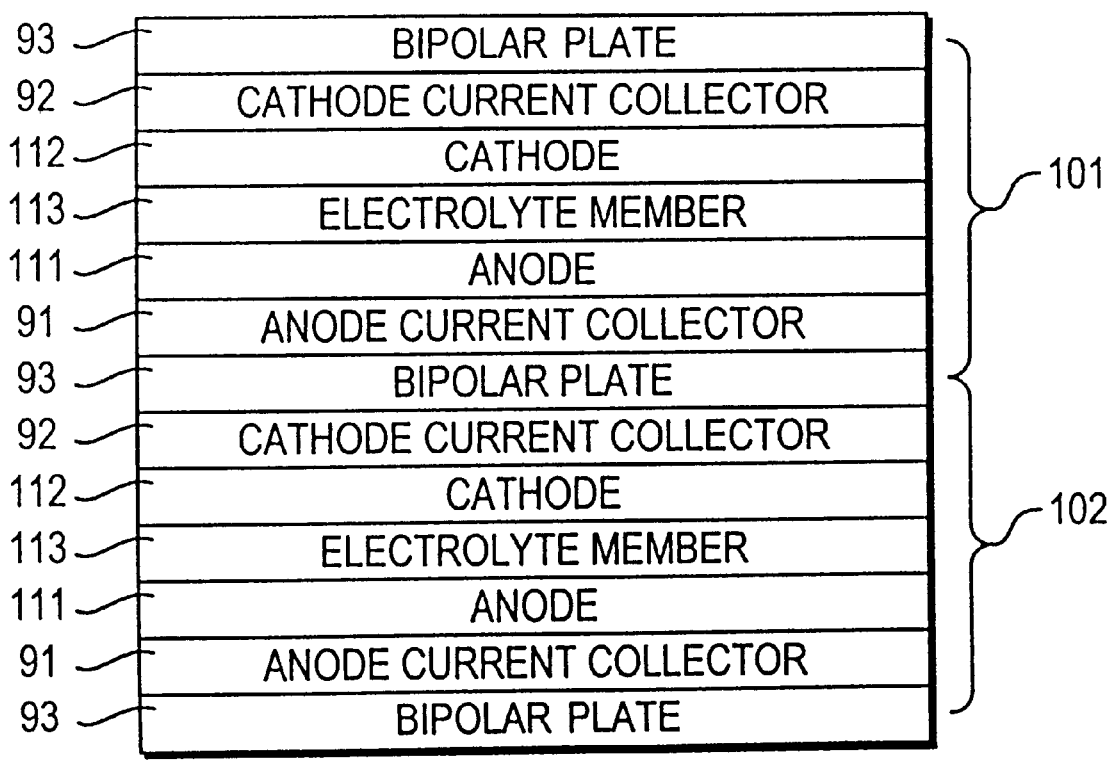
FIG. 14 shows the formation of a fuel stack using the corrugated current collector of the invention.

FIG. 14 shows schematically a direct internal reforming fuel stack comprised of fuel cells 101 and 102. The fuel cells 101 and 102 are formed using the stacked configuration of anode and cathode current collectors 91 and 92 and bipolar plate 93 shown in FIG. 9. As can be seen, each fuel cell includes an anode section formed by an anode electrode 111, an anode current collector 91 and a part of a bipolar plate 93. Each fuel cell also includes a cathode section comprised of a cathode electrode 112, a cathode current collector 92 and a part of a bipolar plate 93. Finally, each fuel cell also includes an electrolyte member 113 situated between the anode and cathode sections 111 and 112.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A corrugated current collector having successive spaced rows of corrugations, with the corrugations in a given row establishing successive peak and valley regions along the given row, said peak regions in each row of corrugations being spaced by a pitch Pt, wherein said pitch Pt is the same from row-to-row, and the spaced rows of corrugations being adapted so that corresponding peak regions from row-to-row establish through passages for receiving and supporting solid catalyst elements, said corresponding peak regions from row-to-row of the rows of corrugations being offset by an amount O, wherein the offset O is finite and less than 50 percent of said pitch Pt and is the same from row to row and a solid catalyst element disposed in each of said passages.

2. A corrugated current collector in accordance with claim 1, wherein the direction of the offset alternates in opposite directions from row-to-row.

3. A corrugated current collector in accordance with claim 1, wherein the peak regions establishing each through passage engage the catalyst element received in the through passage.

4. A corrugated current collector in accordance with claim 1, wherein the corrugated current collector is formed from a punched plate, whereby the punched areas of the plate form the valley regions and the areas between the punched areas form the peak regions of the rows of corrugations.

5. A fuel cell comprising:

an anode section including a separator plate and a corrugated current collector situated adjacent the separator plate, said corrugated current collector having successive spaced rows of corrugations, with the corrugations in a given row establishing successive peak and valley regions along the given row, said peak regions in each row of corrugations being spaced by the same pitch Pt, and the spaced rows of corrugations being adapted so that corresponding peak regions from row-to-row establish through passages for receiving and supporting solid catalyst elements, said corresponding peak regions from row-to-row of the rows of corrugations being offset by the same amount O, said offset O being finite and less than 50 percent of the pitch; and a solid catalyst element disposed in each of said through passages.

6. A fuel cell in accordance with claim 5, wherein the corrugated current collector is formed from a punched plate, whereby the punched areas of the plate form the valley regions and the areas between the punched areas form the peak regions of the rows of corrugations.

7. A fuel cell in accordance with claim 5 further comprising:

a cathode section; and an electrolyte member situated between said anode and cathode sections.

8. A fuel cell system comprising:

a first fuel cell including an anode section, a cathode section and an electrolyte member situated between the anode section and the cathode section, said anode section having a separator plate and a corrugated anode current collector situated adjacent to a first face of the separator plate, said corrugated anode current collector having successive spaced rows of corrugations, with the corrugations in a given row establishing successive peak and valley regions along the given row, said peak regions in each row of corrugations of the corrugated anode current collector being spaced by the same pitch Pt, and the spaced rows of corrugations being adapted so that corresponding peak regions from row-to-row establish through passages for receiving and supporting solid catalyst elements, said corresponding peak regions from row-to-row of the rows of corrugations of the corrugated anode current collector being offset by the same amount O, and the offset O being finite and less than 50 percent of the pitch Pt, and a solid catalyst element disposed in each of said through passages of said corrugated anode current collector;

a second fuel cell including an anode section, a cathode section and an electrolyte member situated between the anode section and the cathode section, said cathode section having a corrugated cathode current collector adjacent a second face of the separator plate, said corrugated cathode current collector having successive spaced rows of corrugations situated transverse to the spaced rows of corrugations of the corrugated anode current collector, with the corrugations in a given row establishing successive peak and valley regions along the given row and the spaced rows of corrugations being adapted so that corresponding peak regions from row-to-row establish through passages.

9. A fuel cell system in accordance with claim 8, wherein peak regions in each row of corrugations of the corrugated cathode current collector are spaced by the same pitch Pt and the corresponding peak regions from row-to-row of the rows of corrugations of the corrugated cathode current collector are offset by the same amount O, and the offset O is finite and less than 50 percent of the pitch.

* * * * *

UNITED STATES PATENT AND TRADEMARK OFFICE
CERTIFICATE OF CORRECTION

PATENT NO.    : 6,492,045 B1
DATED         : December 10, 2002
INVENTOR(S)   : Scott Blanchet et al.

It is certified that error appears in the above-identified patent and that said Letters Patent is hereby corrected as shown below:

Column 2,
Line 8, delete "anode,.cathode" and insert -- anode, cathode --.
Line 53, delete "pressuredistribution" and insert -- pressure distribution --.

Column 4,
Line 44, after "of" delete -- 20 --.

Signed and Sealed this

Twenty-third Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,492,045 B1 Page 1 of 1
DATED : December 10, 2002
INVENTOR(S) : Scott Blanchet et al.

It is certified that error appears in the above-identified patent and that said Letters Patent is hereby corrected as shown below:

<u>Column 1,</u>
Line 4, insert -- STATEMENT AS TO RIGHTS TO INVENTIONS MADE UNDER FEDERALLY SPONSORED RESEARCH AND DEVELOPMENT
This invention was made with Government support under contract DE-FC21-95MC31184 awarded by the Department of Energy. The Government has certain rights in the invention. --.

Signed and Sealed this

Second Day of May, 2006

JON W. DUDAS
*Director of the United States Patent and Trademark Office*